A. E. WESTCOTT.
STANCHION.
APPLICATION FILED JUNE 29, 1915.
1,227,227.
Patented May 22, 1917.
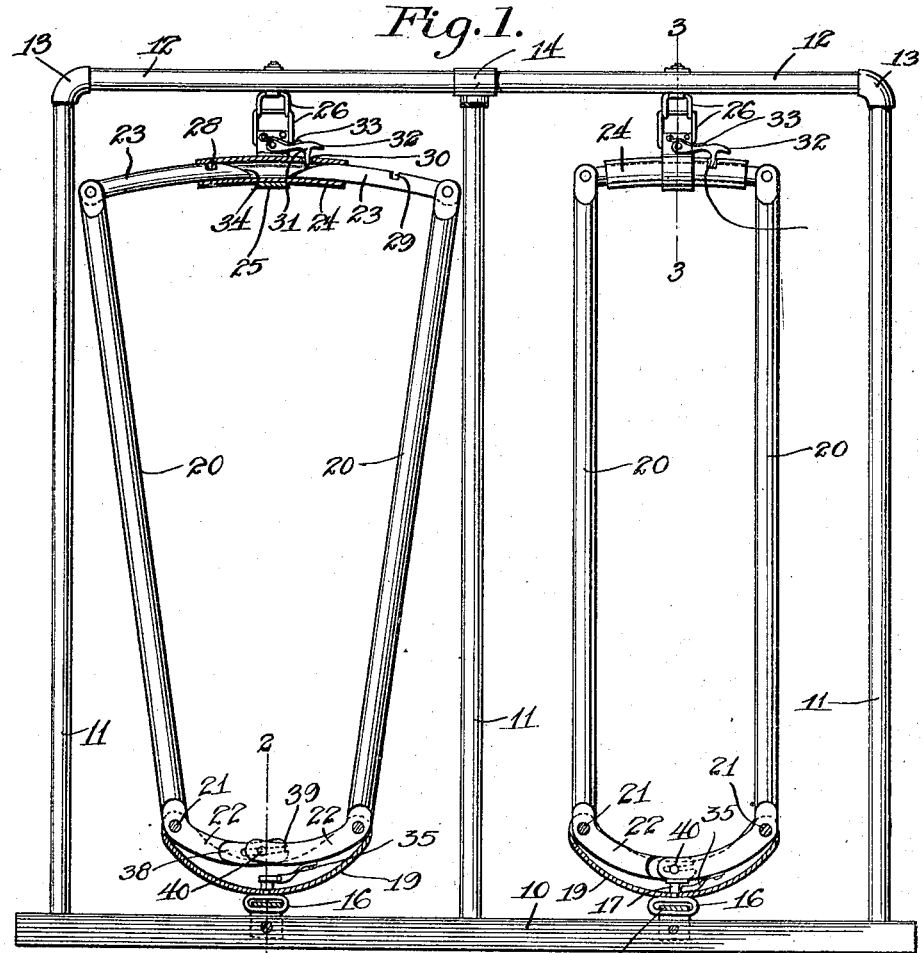

UNITED STATES PATENT OFFICE.

ALLEN E. WESTCOTT, OF ILION, NEW YORK.

STANCHION.

1,227,227.  Specification of Letters Patent.  Patented May 22, 1917.

Application filed June 29, 1915. Serial No. 37,108.

*To all whom it may concern:*

Be it known that I, ALLEN E. WESTCOTT, a citizen of the United States, residing at Ilion, in the county of Herkimer and State of New York, have invented certain new and useful Improvements in Stanchions, of which the following is a specification.

This invention relates to cattle stanchions and contemplates as its principal object the provision of a stanchion which may be locked by a simple closing of the pivoted frame members when the animal is secured therebetween and which will be held non-rotatable while open but rendered rotatable automatically upon a closing of the same.

More specifically it is an object of the present invention to provide a swivel support or stirrup to the extremities of which are pivoted the inclosing members for the animal's neck and to locate within such stirrup means normally preventing the rotation of the stanchion which means may be displaced from its locking position to permit a rotation of the stanchion when the pivoted members have been swung into their closed position, these latter being provided with an automatic spring lock which necessitates manual release of the animal.

It is an object of equal importance to slidably connect the lower extremities of the inclosing members on the animal's neck in such manner that movement of either of the members will close both of them, thus facilitating operation of the device.

The above and additional objects which will become apparent as this explanatory description proceeds, are accomplished by such means as are illustrated in the accompanying drawings, described in the following specification and then more particularly pointed out in the claims which are appended hereto and form a part of this application.

With reference to the drawings, wherein there is illustrated the preferred embodiment of this invention as it is reduced to practice, and throughout the several views of which like characters of reference designate similar parts:—

Figure 1 is an elevational view of a pair of stanchions such as are comprehended by this invention, being shown in respectively open and closed positions, parts of the one stanchion being shown in section;

Figs. 2 and 3 are respectively vertical sectional views taken on the line 2—2 and 3—3 of Fig. 1;

Fig. 4 is a perspective detail of the locking detent normally preventing rotation of the stanchions, and Fig. 5 is a detail in plan of the swiveling pin adapted to co-act with said detent.

In the embodiment illustrated the numeral 10 designates a sill or other piece of curbing upon which the stanchions are to be erected. Vertical uprights 11 are supported by this sill and are connected at their tops by bars 12. The horizontal spacing of the uprights 11 is determined by the stall space for each animal as will be apparent from a reference to Fig. 1. It should be noted that a very cheap and desirable form of framing is contemplated by this invention as including cast iron piping or similar hollow cylindrical members, the extremities of which may be screw threaded for ready joinder through the medium of elbows 13 and sleeves 14. While this forms a framing for the stanchions of this invention which has been found to be suitable in every respect of lightness, cheapness, rigidity and durability, it is, of course, understood that the applicant is not limited to the use of this one form of framing.

Secured to the sill 10 between each pair of adjacent uprights 11 is the inverted U-shaped support 15 which is spaced from the sill for the sliding engagement of a loop 16 carrying the upwardly projecting swivel pin 17 having a head formed with a slot or recess 18 as clearly shown in Fig. 5, and provided for a purpose to be hereinafter more clearly set forth. The loop 16 prevents any rotation of the pin 17 which would result in disalinement of the recess 18 with a curved stirrup 19 through which said pin passes, the stirrup through the loop 16 being upheld by the support 15.

This stirrup is preferably U-shaped in cross section as will be apparent from an inspection of Fig. 2 and is preferably arcuately constructed in substantially a semicircular shape. At its extremities are pivoted the movable stanchion members 20 through the medium of pins 21, which extend through the stanchion members at their flattened and turned lower ends 22, the upper extremities of such members carrying the pivoted catch members 23. As shown in Fig. 3, these catch members are of a semicircular shape in cross section in order to be readily and slidably received within an inclosing sleeve 24 which is in turn supported by a sleeve 25 and hangers 26, the uppermost of which may be secured by a bolt 27 or similar means to the connecting bar 12. Catch recesses 28 and 29 are formed in respective members 23 in order to register with an aperture 30 formed in the supporting sleeve 24, when the bars 20 have been moved inwardly to their closed position. Through this aperture 30 there is adapted to resiliently project the keeper 31, such keeper being pivoted to the sleeve bracket 25 and being also formed with a latch portion 32 whereby its release from the registering apertures may be assured. A leaf spring or similar means 33 acts upon the keeper to normally force the same into the registering apertures. Each extremity of the catch members 23 is rounded as denoted by the numeral 34 in order to engage the projecting end of this keeper in permitting the same to ride upward in its aperture when the bars 21 are approached into their locking position.

The means preventing rotation of the stanchion when occupying its unlocked position include the resilient detent designated 35 and formed with a securing portion 36 adapted to be fastened to the turned ends 22 of one of the uprights 20 while also having the twisted detent terminal 37 which is adapted to enter the recess 18 formed in the head of the swiveling pin 17. As illustrated in Fig. 1, this detent is normally engaged with the pin 17 and prevents rotation of the entire stanchion since the loop 16 carrying this pin maintains it in a stationary position with respect to the support 15.

The turned lower extremities 22 of each of the uprights 20 are respectively reduced and bifurcated as denoted by the numerals 38 and 39, the reduced end 38 being formed with a slot for the reception of the pin 40 through the bifurcation 39. This construction permits movement of either stanchion upright to operate the other so that the device may be readily locked or unlocked from either side of the animal.

Upon the stanchion being closed the member 20 bearing the detent 35 is moved inwardly to the vertical position illustrated at the right of Fig. 1, such detent being swung out of engagement with the locking notch 18 and permitting the stanchion to swivel about the pin 17, as is desirable for the comfort of the animal in feeding. When the stanchion is opened as shown to the left of Fig. 1, the detent 37 will again engage the recess 18 in preventing rotational movement of the stanchion in order that the animal's head may readily be directed between the members 20. The loop 16 also mounts the stanchion to have forward and rearward sliding movement upon the support 15 permitting the device to adjust itself to the peculiarities of various animals.

It should be apparent from the foregoing, that means have been provided for attaining the previously presented objects in a novel and desirable manner since the stanchion is automatically released for swiveling movement when closed and is as automatically locked in position when opened, the locking movement itself being automatic for the closure of the stanchion when the animal is secured thereby and also necessitating a manual release when it is desired to remove the animal.

While in the foregoing however, there has thus been illustrated in the drawings and described in the specification such combination and arrangement of elements as constitute the preferred embodiment of this invention, it is desired to emphasize the fact that such minor changes in the matters of proportion anad degree may be made in later adaptations of this device as shall not alter the spirit of the invention as defined in the appended claims.

What is claimed is:—

1. A stanchion including a support, a pin slidably mounted on said support, a stirrup pivoted on said pin, uprights hinged on said stirrup, locking means for the free ends of the extremities of said uprights, and means on one of said uprights to engage said pin when the uprights are in open position to lock the stanchion against rotation.

2. A stanchion including hinged uprights, a locking extremity pivotally connected to the free end of each of said uprights, a socket open at both ends to receive said extremities, a stirrup to which said uprights are hinged, a slidably supported pin pivotally carrying said stirrup, and means carried by one of said uprights when in open position to lock said stanchion against rotation.

3. A stanchion including a support, hinged uprights rotatably and slidably mounted thereon, a locking sleeve open at its opposite ends supported at the upper end of said stanchion, locking extremities pivoted to said uprights and adapted to enter the open ends of said sleeve, and a keeper adapted to engage a notch in each of said extremities when the stanchion is closed and lock said uprights.

4. A stanchion including a support, uprights pivoted to said support, a pivoted extremity on each upright, means for slidably connecting the pivoted extremities of said uprights, a keeper to lock said extremities and uprights in one of their extreme positions, and means for rotatably and slidably mounting said support.

5. A stanchion including a support, a member slidable upon said support, uprights pivoted to said member, a locking extremity pivoted to each upright, a sleeve to support said extremities and means on said sleeve for simultaneously engaging and locking such extremities.

6. A stanchion including a support, uprights pivoted to said support, means for slidably connecting to said support the pivoted extremities of said uprights, a locking extremity pivoted to each upright, and means for simultaneously engaging such extremities.

7. A stanchion including a support, uprights pivoted to and slidable on said support, a locking sleeve, a keeper on the sleeve, locking arms pivoted to said uprights for engagement within said sleeve and with the keeper, and means to permit slidable engagement between the opposite extremities of said uprights.

8. A stanchion including a support, a link slidable on said support and having an upstanding pin, a curved stirrup rotatably mounted on said pin, uprights pivoted to said stirrup, catch members pivotally carried by the upper ends of said uprights and each having a locking notch, a locking keeper adapted to engage notches of both of said members, and means carried by one of said uprights to engage said pin and prevent rotational movement of the stanchion when the uprights are open.

9. A stanchion including a support, means slidable on said support and having a pin projecting upwardly therefrom, a stirrup rotatable on said pin, uprights pivoted to said stirrup, means holding the lower extremities of said uprights in constant engagement, and means for locking the upper extremities of said uprights.

10. A stanchion including a support, means slidable on said support and having a pin projecting upwardly therefrom, a stirrup rotatable about said pin, uprights hinged on said stirrup, catch members connected to the upper extremities of said uprights, means for simultaneously locking said catch members, and means for maintaining the lower extremities of said uprights in constant sliding engagement.

11. A stanchion including a support, means slidable on said support and having a pin projecting upwardly therefrom, a stirrup rotatably mounted on said pin, uprights hinged to said stirrup, catch members carried by the upper ends of said uprights, locking members for engagement with said catch members, means for slidably connecting the lower extremities of said uprights, and means carried by one of said uprights for locking engagement with said pin.

12. A stanchion including a support, means slidable on said support and having a pin projecting upwardly therefrom, a stirrup rotatably mounted on said pin, uprights hinged to said stirrup, catch members connected with the upper ends of said uprights, a sleeve to receive said members, locking means operable through the sleeve to lock said members, means slidably maintaining the lower extremities of said uprights in constant engagement and resilient detent means carried by one of said uprights for locking engagement with said pin.

13. A stanchion including a support, a loop slidable along said support, a pin carried by said loop, a curved stirrup rotatable around said pin, uprights hinged to said stirrup, means maintaining the extremities of said uprights in constant sliding engagement, resilient detent means carried by one of said uprights for locking engagement with said pin when the uprights are in open position, catch members pivoted to the opposite extremities of said uprights, a sleeve to receive said catch members, and resiliently impelled locking means to project through said sleeve and lock said uprights when closed through said members.

In testimony whereof I affix my signature in presence of two witnesses.

ALLEN E. WESTCOTT.

Witnesses:
HENRY G. KLIPPEL,
JAMES CONKLING.

Copies of this patent may be obtained for five cents each, by addressing the "Commissioner of Patents, Washington, D. C."